United States Patent Office 3,204,702
Patented Sept. 7, 1965

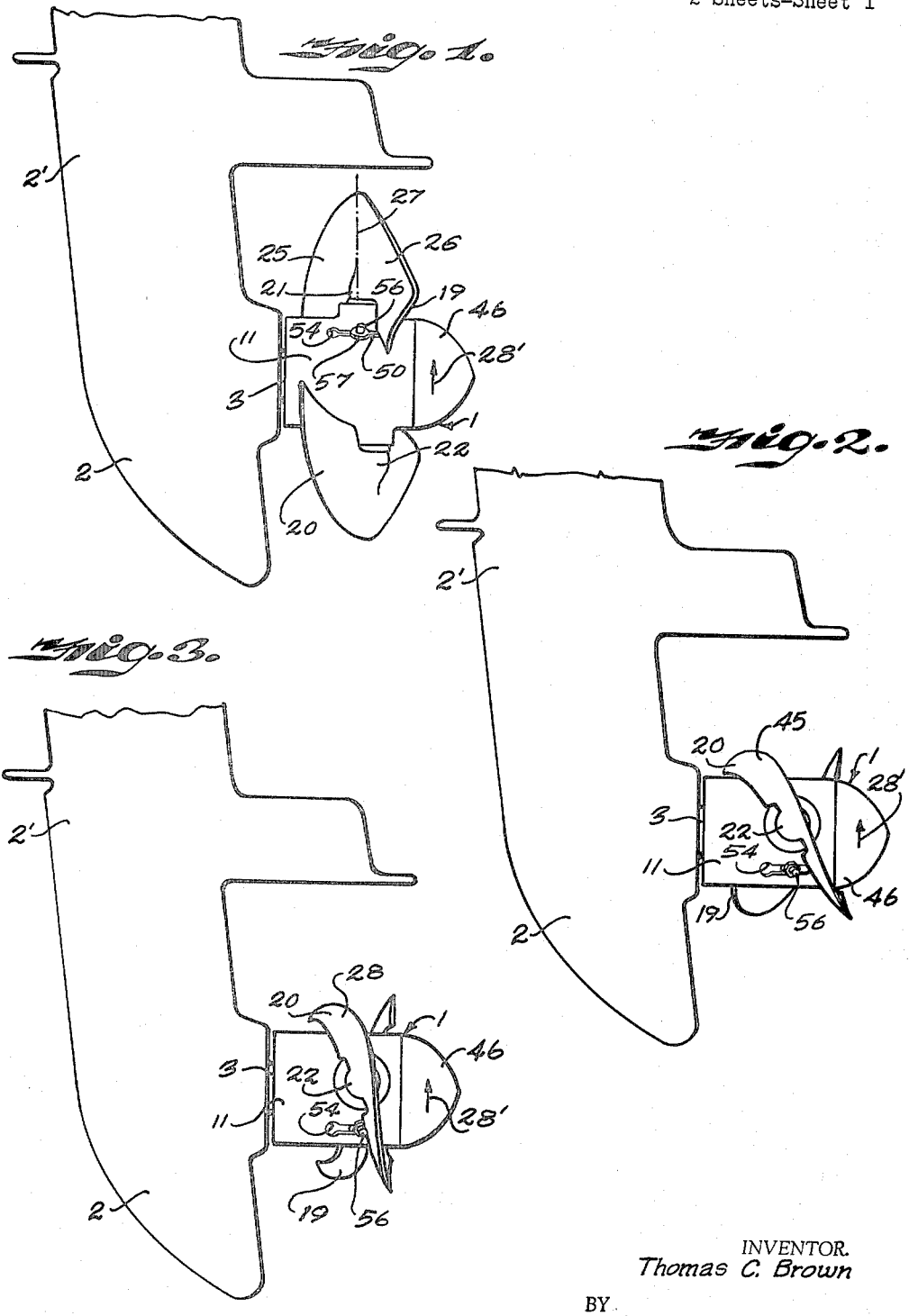

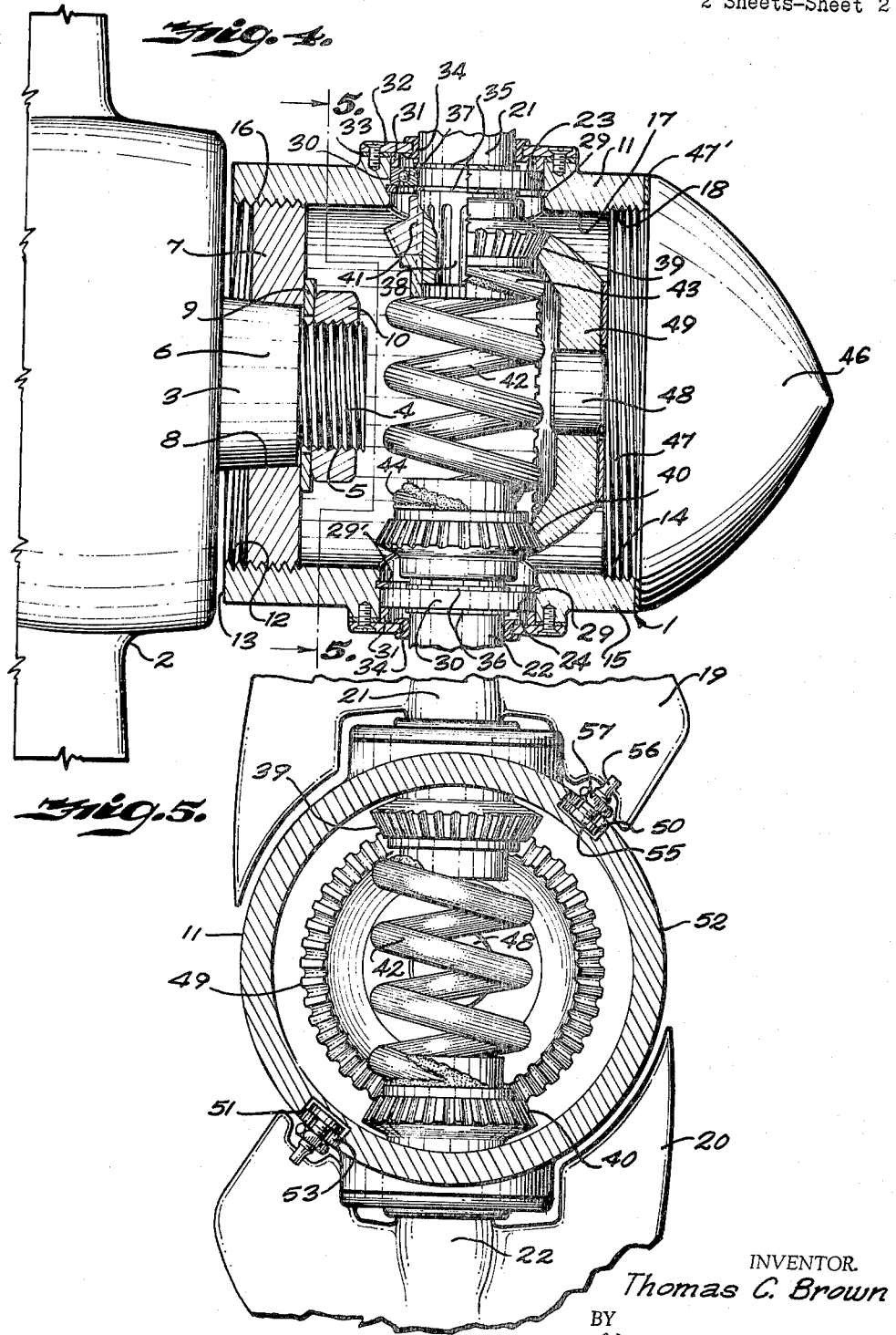

3,204,702
AUTOMATIC VARIABLE PITCH PROPELLER
Thomas C. Brown, 4828 Harrison, Kansas City, Mo.
Filed May 4, 1964, Ser. No. 364,544
4 Claims. (Cl. 170—160.53)

This invention relates to variable pitch propellers, and more particularly to a propeller apparatus which operates within a narrow torque range regardless of speed by automatically varying between low pitch and high pitch positions.

The principal objects of the present invention are: to provide a variable pitch propeller apparatus which greatly decreases drive shaft torque variations permitting more efficient operation of many internal combustion engines over their entire operational rotational speed range; to provide such a device which may be easily adjusted for limiting the minimum or lowest pitch position to achieve a desired mode of operation; to provide such apparatus which is of simple construction and therefore may be suitable for small, inexpensive outboard motors; to provide such apparatus which utilizes a torsion spring extending transversely of the drive shaft axis for more direct torsional force application to the blades; and to provide such a propeller arrangement which is rugged in use, easily maintained and well adapted for its intended functions.

Other objects and advantages of this invention will become apparent from the following description taken in connection with the accompanying drawings wherein are set forth by way of illustration and example certain embodiments of this invention.

FIG. 1 is a fragmentary side elevation showing a variable propeller apparatus embodying this invention mounted on an outboard motor with the blades assuming an intermediate pitch position corresponding to intermediate output shaft rotational speed.

FIG. 2 is a fragmentary side elevation similar to FIG. 1 showing the blades in a high pitch position corresponding to low output shaft rotational speed.

FIG. 3 is a fragmentary side elevation similar to FIG. 1 showing the blades in low pitch or high output shaft rotational speed.

FIG. 4 is a fragmentary cross-sectional side elevation through the apparatus on a larger scale showing the interior of the apparatus hub block.

FIG. 5 is a vertical cross-sectional view through the apparatus taken on the line 5—5, FIG. 4, showing further details of construction.

Referring to the drawings in more detail:

The reference numeral 1 generally indicates a propeller apparatus embodying this invention. The apparatus 1 is illustrated mounted on the lower portion 2 of an outboard motor 2' having a drive shaft 3 extending rearwardly thereof. The drive shaft 3 includes a rear portion 4 in the illustrated example having threads 5, FIG. 4. The drive shaft 3 is tapered at 6 and receives thereover a circular mounting plate 7 having a tapered bore 8 adapted to match the shaft taper at 6. The plate 7 is rigidly centered and secured to the shaft 3 due to pressure applied through a washer 9 by a nut 10 threadedly engaged with the shaft threads 5.

A hollow sleeve or hub block 11 has internal threads 12 at the forward end 13 thereof and internal threads 14 at the rear end 15 thereof. The plate 7 has external or peripheral threads 16 threadedly engaged with the hub block internal threads 12 for rigidly mounting the hub block 11 coaxially of the drive shaft 3 for rotation therewith. The hub block 11 forms a hollow interior chamber 17 and includes an opening 18 at the rearward end thereof providing access into the chamber, the opening 18 being spaced coaxially of the drive shaft rear portion 4.

A pair of opposed propeller blades designated 19 and 20 extend radially of the hub block 11 and each has a stem, designated 21 and 22 respectively, extending through lateral or side openings 23 and 24 in the hub block 11 and into the chamber 17. The blades 19 and 20 each have unequal reaction surfaces 25 and 26 located on opposite sides of the blade longitudinal axis 27 and which respond to pressure exerted by the medium in which the apparatus is operating for rotatably urging the blades about the axis 27 toward a low pitch position 28 (FIG. 3) upon rotation of the drive shaft 3 in the direction for propelling a craft forward as indicated by the arrow 28'.

The hub block 11 has grooves 29 in the walls of the respective openings 23 and 24. The grooves each receive a split ring 29' for supporting a suitable bearing 30 on the outer race thereof which also engages the wall of the openings 23 and 24. A spacer 31 engages the outer race of the bearings 30 and is itself maintained in position with caps 32 secured to the hub block 11. Suitable seals 33 are located between the caps 32 and the hub block 11. The caps 32 have shaft seals 34 mounted thereon and engaging the stems of the respective blades 19 and 20 which extend therepast into the chamber 17. Suitable grooves 35 are spaced along the respective blade stems and mount split rings 36 which engage opposite sides of the bearing inner race 37 so as to maintain the stem in a fixed axial position with respect to the bearing. The above-described bearing structure causes the respective blades to be radially retained with respect to the hub block 11 but permits axial rotation thereof for varying the pitch.

The stems 21 and 22 of the respective blades terminate within the chamber 17 in opposed spaced apart coaxial splined portions 38. A pair of opposed spaced apart bevel gears designated 39 and 40 each have a splined bore 41 receiving the respective splined portions 38 for axial rotation of the bevel gears with the respective propeller blades. A helical torsion spring 42 freely extends transversely of the drive shaft 3 within the chamber 17 and has opposite ends 43 and 44 thereof secured to the respective bevel gears 39 and 40, in the illustrated example by welding, for rotation therewith. The torsion spring 42 prevents the gears 39 and 40 from moving radially inwardly and thus maintains the bevel gears 39 and 40 assembled with the respective splined portions 38. Also, the blades are rotated prior to assembly so that the spring 42 is wound or stressed and thus urges the blades toward the high pitch position illustrated in FIG. 2.

A hub cap 46 is secured to the hub block 11 by means of external threads 47 engaging with the block internal threads 14, closing the opening 18. A seal 47' prevents water leakage between the threads 47 and 14. The hub cap 46 has a stub shaft 48 coaxially extending toward the drive shaft 3 and located on the opposite side of the spring 42 from the drive shaft rear portion 4. A bevel gear 49 is rotatably mounted on the stub shaft 48 and engages both bevel gears 39 and 40. Due to the simultaneous engagement of the bevel gears 39 and 40 with the gear 49, the blades 19 and 20 must rotate in unison in opposite directions.

Suitable slots 50 and 51 extend along the exterior surface 52 of the hub block 11 in directions which respectively intersect the path taken by portions of the blades 19 and 20 upon rotation about the respective stems 21 and 22. The slots 50 and 51 are partially covered by ledges 53 which expose the full width of the slots at one end 54. The head 55 of a suitable stop bolt 56 may be inserted into the slot at 54 and moved therealong. A nut 57 is threadedly engaged with the bolt and when tightened draws the head 55 against the ledges so that the respective bolt is fixed in position on the hub block 11. The bolts are of sufficient length so that they engage the respective blades whereby the minimum or low pitch position is defined. Although a single stop bolt may be adequate to define the minimum pitch of both blades, a slot and bolt for each blade is provided in the illustrated example (FIG. 5) to eliminate possible variations in minimum pitch angle between the two blades due to gear play.

In operation, when the engine is operated at low speed, a relatively high pitch angle is provided so that torque load on the engine will be within an acceptable range for efficient operation. As the speed of the engine is increased, the reaction of the water against the blades will cause same to assume a lower pitch such as that illustrated in FIG. 3 whereby the torque remains within an acceptable range for efficiency. The moving of the blades to the lower pitch position is accompanied by an increase in torsional stress on the spring 42 and the characteristics of this spring are chosen so that sufficient resistance against blade rotation is provided to produce the acceptable output shaft torque. The minimum angle or pitch is determined by the position of the stop bolt or bolts 56 which is calculated as a function of the desired maximum engine speed.

Although one form of this invention has been illustrated and described, it is not to be limited to the specific form or arrangement of parts herein described and shown except insofar as such limitations are included in the claims.

What I claim and desire to secure by Letters Patent is:

1. A controlled torque range propeller apparatus for automatic operation between a low pitch and a high pitch position comprising:
   (a) a drive shaft having a rear portion, a hollow hub block fixed to the shaft at said rear portion and forming a chamber,
   (b) a pair of opposed propeller blades extending radially of said hub block, said blades each having a stem extending through said hub block and into said chamber, said blades each having unequal reaction surfaces rotatably urging said blades toward said low pitch position upon rotational driving of said shaft,
   (c) bearing means on said hub block and engaging said stems for mounting said blades against radial movement while permitting axial rotation thereof, said stems terminating within said chamber in respectively opposed spaced apart coaxial splined end portions,
   (d) a pair of opposed spaced apart members each having a splined bore freely outwardly radially receiving said respective splined end portions thereinto for axial rotation with said blades, a wound helical torsion spring freely extending coaxially between said end portions within said chamber and having opposite ends thereof secured to said members for rotation therewith, said spring urging said members radially outwardly into engagement with said end portions, said spring also rotationally urging said blades toward said high pitch position,
   (e) means secured with respect to said hub block and having a support positioned between said members, and
   (f) a member mounted on said support and engaging said pair of members for providing synchronization of movement between said pair of members.

2. The apparatus as set forth in claim 1 wherein said pair of members are bevel gears and said member is a bevel gear.

3. The apparatus as set forth in claim 1 wherein said support is a stub shaft for rotatably mounting said member.

4. The apparatus as set forth in claim 1 including:
   (a) a slot extending along said hub block in a direction intersecting the rotational path of one of said blades, and
   (b) a stop member in said slot and adapted to be adjustably secured therealong, said stop member engaging said last-named blade to limit minimum pitch to a desired angle.

References Cited by the Examiner

UNITED STATES PATENTS

| 1,250,263 | 12/17 | Yates | 170—160.51 |
| 1,919,586 | 7/33 | Dodge | 170—160.51 |
| 2,005,343 | 6/35 | Kent | 170—160.51 |
| 2,290,666 | 7/42 | Ashelman et al. | 170—160.51 |
| 2,395,862 | 3/46 | Freeman et al. | 170—160.61 X |
| 3,145,780 | 8/64 | Kean | 170—160.51 X |

FOREIGN PATENTS

| 545,152 | 7/22 | France. |
| 727,968 | 11/42 | Germany. |
| 36,986 | 12/35 | Netherlands. |

SAMUEL LEVINE, *Primary Examiner.*

JULIUS E. WEST, *Examiner.*